Patented Mar. 23, 1954

2,673,219

UNITED STATES PATENT OFFICE 2,673,219

MANUFACTURE OF PIMELIC ACID

Frederick William Major, Hull, and Herbert Muggleton Stanley, Tadworth, England, assignors to The Distillers Company Limited, Edinburgh, Scotland, a British company No Drawing. Application November 13, 1950, Serial No. 195,484

Claims priority, application Great Britain November 19, 1949

3 Claims. (Cl. 260—537)

1

The present invention relates to the manufacture of pimelic acid, and relates particularly to the preparation of pimelic acid from delta$^3$-tetrahydrobenzaldehyde and derivatives thereof.

It is known from U. S. Patent 2,454,047 that alicyclic aldehydes with one olefinic linkage in the ring are converted into an alicyclic acid and the corresponding alcohol by contacting the aldehyde with substantially anhydrous molten or fused alkali metal hydroxides. It has now been found that delta$^3$-tetrahydrobenzaldehyde and derivatives thereof may be converted directly to pimelic acid by treatment with aqueous alkali metal hydroxides.

Accordingly the present invention is for a process for the manufacture of pimelic acid which comprises contacting in the liquid phase a compound selected from the group consisting of delta$^3$-tetrahydrobenzaldehyde, delta$^3$-tetrahydrobenzaldehyde trimer and the alkaline condensation products of delta$^3$-tetrahydrobenzaldehyde, with an aqueous solution of an alkali metal hydroxide, the reaction mixture being brought to a temperature in the range 250°–400° C., and thereafter separating the pimelic acid from the reaction mixture.

Suitably the reaction mixture is heated until the original aldehyde is completely reacted and the desired conversion into pimelic acid is attained. Alternatively, the delta$^3$-tetrahydrobenzaldehyde starting material is first contacted with the alkali metal hydroxide at a low temperature—suitably about room temperature—and the reaction mixture then heated to a temperature in the range 250° C.–400° C. with or without separation of the constituents of the mixture as is desired.

It has been observed that under the more severe reaction conditions, for example, when using reaction temperatures in excess of about 300° C., only a very small quantity of the corresponding alicyclic alcohol is formed.

It is preferred to employ the alkali metal hydroxide, such as sodium hydroxide or potassium hydroxide, or a mixture of both in aqueous solution in an amount in excess over that required for the conversion into the alkali metal salts of the dicarboxylic acid ultimately obtained. Thus it is advantageous to use a 10 to 80% excess of alkali over the theoretical requirement. The concentration of the aqueous alkali metal hydroxide may vary over a wide range; it is preferred to use aqueous alkali metal hydroxide of about 30–40% concentration by weight.

The reaction is suitably carried out in closed

2 vessels under pressures high enough to maintain the reaction mixture in the liquid phase; it is, however, advantageous to release continuously or intermittently the gas that is produced during the reaction. The process may be carried out batchwise or continuously, for example by passing the aldehyde and the alkali solution through a suitably heated reactor.

Delta$^3$-tetrahydrobenzaldehyde trimer may be employed in the processes of the invention either alone, or in solution in an inert solvent, or alternatively in the form of a mixture with the monomer, as is obtained by the acid trimerisation of delta$^3$-tetrahydrobenzaldehyde. The preparation of the trimer is described for instance in Chemical Abstracts, 1938, volume 32, page 7905. The alkaline condensation products of delta$^3$-tetrahydrobenzaldehyde are obtained by treating delta$^3$-tetrahydrobenzaldehyde with an aqueous alkali at low temperatures, for example at or about room temperature.

The following examples are given to illustrate the way in which the process of the invention may be carried out in practice. The parts by weight and parts by volume bear the same relation to each other as do grams to millilitres:

Example 1

An autoclave is charged with:

45 parts by weight of delta$^3$-tetrahydrobenzaldehyde and 123 parts by volume of 40% by weight aqueous sodium hydroxide solution.

After sealing the autoclave is heated for six hours at a temperature between 340° and 360° C., with agitation. Pressure rises during the course of reaction to a final maximum of 190 atmospheres gauge. When cold, residual gas under a pressure of 31 atmospheres is discharged, and the product, in the form of an aqueous solution with a little oily material, is removed from the autoclave with the aid of sufficient ether and water for washing. The oily material, to a total of 12.4 parts by weight is removed by one ether extraction and the aqueous layer then filtered. The filtrate may be concentrated by evaporation before it is acidified with aqueous HCl until acid to litmus but not to Congo red. The small amount of oily acid by-product which separates is collected in ether and removed. Complete acidification of the remainder with aqueous HCl then enables the pimelic acid to be precipitated. The crude acid is obtained in a crystalline form by bringing the acid liquor to the boil, and allowing to cool in ice.

After filtration, the colourless crystalline acid is given a short wash with a little ice water, and dried in vacuo, giving 22.5 parts by weight of pimelic acid (melting point 100–102° C.).

*Example 2*

In a suitably stirred autoclave, a mixture of 45 parts by weight of crystalline trimer of delta$^3$-tetrahydrobenzaldehyde (melting point 175–176° C.) and 123 parts by volume of 40% by weight aqueous sodium hydroxide solution is heated to a temperature between 340 and 360° C. for six hours. After the autoclave has been cooled down the residual pressure of 48 atmospheres is released. The aqueous layer of the reaction product is acidified in hydrochloric acid and the pimelic acid isolated by extraction with a suitable solvent, such as ether or ethyl acetate or methyl isobutyl ketone. On evaporation of the solvent 45 parts by weight of crude pimelic acid are obtained.

*Example 3*

80 parts by weight of delta$^3$-tetrahydrobenzaldehyde are polymerised by the addition of 2 parts by weight of a 10% by weight solution of sulphuric acid in tetrahydrobenzyl alcohol. A solid mass crystallises out within 30 minutes, which comprises the trimeric polymer admixed with some monomeric delta$^3$-tetrahydrobenzaldehyde. 45 parts by weight of this crude trimeric polymer are heated to 340–360° C. for 6 hours, in a rocking autoclave with 123 parts by volume of 40% by weight aqueous sodium hydroxide solution. On working up the reaction mixture according to the previous example, 39.9 parts by weight of crude pimelic acid are obtained.

*Example 4*

A suitably agitated autoclave is charged with a mixture of 53.5 parts by weight of delta$^3$-tetrahydrobenzaldehyde and 154 parts by weight of 48% by weight aqueous potassium hydroxide solution. The mixture is heated for six hours at a temperature of 300° C., with agitation. When cold, a residual pressure of 35 atmospheres is released, and the product discharged in the form of an aqueous solution and some oily layer. The oily material is removed by extraction in ether, and the aqueous layer filtered from some sediment from the autoclave. The filtrate is acidified to Congo red by the addition of 80 parts by volume of hydrochloric acid (specific gravity 1.18), and the acid liquor extracted with ether for 18 hours in a continuous extraction apparatus. Evaporation of the ether extract yields 49 parts by weight of crude pimelic acid, melting point (after pressing on a tile) 87–96° C. The crude acid is purified by washing with benzene.

*Example 5*

A rocking autoclave is charged with 70 parts by weight of delta$^3$-tetrahydrobenzaldehyde and 191 parts by volume of 40% by weight aqueous sodium hydroxide solution. The mixture is heated at a temperature of 260° C. for 24 hours, with agitation, during which time the pressure rises to 112 atmospheres. When cold, the residual gas to a pressure of 46 atmospheres is released, and the product is discharged as an aqueous solution together with some oily layer. The oily material is removed as before by extraction in ether, and the aqueous layer filtered from some corrosion products from the autoclave. The aqueous portion is then acidified to Congo red with 120 parts by volume of hydrochloric acid, specific gravity 1.18, and the acid liquor extracted for 18 hours in a continuous extraction apparatus with ether. Evaporation of the extract yields pimelic acid in crude crystalline form which can be purified, by washing the crystals with a little benzene.

*Example 6*

A rocking autoclave is charged with a mixture of 45 parts by weight of delta$^3$-tetrahydrobenzaldehyde, and 123 parts by volume of 40% by weight aqueous sodium hydroxide solution. The mixture is heated for three hours at 300° C. with agitation. When cold the product is discharged from the autoclave in the form of an aqueous solution and some oily layer. The oily material is removed by extraction with ether, and the aqueous layer filtered from a little sediment from the autoclave. The filtrate is acidified to Congo red by addition of hydrochloric acid (specific gravity 1.18) and the acid liquor extracted with ether for 18 hours in a continuous extraction apparatus. Evaporation of the ether extract yields 39.6 parts by weight of total acid materials. By washing these crystals with a little benzene, 28.6 parts by weight of pimelic acid of melting point 101–103° C. are obtained. This corresponds to a yield of 43.7%.

We claim:

1. A process for the manufacture of pimelic acid which comprises contacting in the liquid phase a compound selected from the group consisting of delta$^3$-tetrahydrobenzaldehyde, delta$^3$-tetrahydrobenzaldehyde trimer and the alkaline condensation products of delta$^3$-tetrahydrobenzaldehyde, with an aqueous solution of an alkali metal hydroxide, the reaction mixture being brought to a temperature in the range 250°–400° C., and thereafter separating the pimelic acid from the reaction mixture.

2. A process as claimed in claim 1, wherein an excess of 10–80% by weight over the theoretical requirement of alkali metal hydroxide is employed.

3. A process as claimed in claim 1, wherein a mixture of delta$^3$-tetrahydrobenzaldehyde and delta$^3$-tetrahydrobenzaldehyde trimer, is employed.

FREDERICK WILLIAM MAJOR.
HERBERT MUGGLETON STANLEY.

References Cited in the file of this patent

UNITED STATES PATENTS

| Number | Name | Date |
|---|---|---|
| 2,454,047 | Finch et al. | Nov. 16, 1948 |

OTHER REFERENCES

Adams et al., "Org. Reactions" (Wiley), vol. II, pp. 94–98 (1944).